(12) United States Patent
Gerhards et al.

(10) Patent No.: US 10,773,447 B2
(45) Date of Patent: Sep. 15, 2020

(54) QUICK-CHANGE MANDREL HAVING ACTIVE PREFORM CLAMPING

(71) Applicant: KHS Corpoplast GmbH, Hamburg (DE)

(72) Inventors: Martin Gerhards, Hamburg (DE); Dieter Klatt, Hamburg (DE); Alexander Jacobsen, Hamburg (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 16/604,466

(22) PCT Filed: Oct. 17, 2018

(86) PCT No.: PCT/EP2018/078366
§ 371 (c)(1),
(2) Date: Oct. 10, 2019

(87) PCT Pub. No.: WO2019/076962
PCT Pub. Date: Apr. 25, 2019

(65) Prior Publication Data
US 2020/0147854 A1 May 14, 2020

(30) Foreign Application Priority Data

Oct. 17, 2017 (DE) .................. 10 2017 124 186

(51) Int. Cl.
*B29C 49/42* (2006.01)
*B29C 49/64* (2006.01)
(Continued)

(52) U.S. Cl.
CPC .......... *B29C 49/4205* (2013.01); *B29C 49/38* (2013.01); *B29C 49/64* (2013.01); *B29C 49/36* (2013.01)

(58) Field of Classification Search
CPC ..................... B29C 49/4205; B29C 49/64
See application file for complete search history.

(56) References Cited

U.S. PATENT DOCUMENTS

| 4,076,071 A | 2/1978 | Rosenkranz et al. |
| 4,572,355 A | 2/1986 | Hunter |

(Continued)

FOREIGN PATENT DOCUMENTS

| CN | 101142072 A | 3/2008 |
| CN | 102015249 A | 4/2011 |

(Continued)

OTHER PUBLICATIONS

International Search Report dated Feb. 19, 2019 filed in PCT/EP2018/078366.

*Primary Examiner* — Robert B Davis
(74) *Attorney, Agent, or Firm* — Rankin, Hill & Clark LLP (57) ABSTRACT

The invention relates to a transport system for transporting preforms in a device for the blow-molding production of finished containers, wherein the transport system comprises a transport chain, the chain elements of which have a support element for transporting the preforms, wherein the support element comprises a shaft part and a head part, and the head part has a head end region that can be introduced into the opening section of the preform, characterized in that the head part is retained on the shaft part and can be detached from the shaft part via actuation of a first actuation element, wherein the first actuation element is arranged in the shaft part end region facing away from the head part. The invention also relates to a device for the blow-molding production of finished containers from preforms, a use, as well as a method for exchanging at least one head part, each making use of the transport system according to the invention.

11 Claims, 7 Drawing Sheets

(51) Int. Cl.
*B29C 49/38* (2006.01)
*B29C 49/36* (2006.01)

(56) References Cited

U.S. PATENT DOCUMENTS

| | | |
|---|---|---|
| 5,346,386 A | 9/1994 | Albrecht et al. |
| 5,648,026 A | 7/1997 | Weiss |
| 9,878,482 B2 | 1/2018 | Zoppas et al. |
| 2008/0166445 A1 | 7/2008 | Baumgarte et al. |
| 2010/0310705 A1 | 12/2010 | Schönberger et al. |
| 2011/0120840 A1 | 5/2011 | Schonberger |
| 2011/0177193 A1 | 7/2011 | Linke et al. |
| 2012/0111700 A1 | 5/2012 | Gillet et al. |
| 2013/0200642 A1* | 8/2013 | Duclos ................... B25J 15/00 294/93 |
| 2014/0161924 A1 | 6/2014 | Linke et al. |

FOREIGN PATENT DOCUMENTS

| | | |
|---|---|---|
| CN | 102470602 A | 5/2012 |
| DE | 2352926 A1 | 4/1975 |
| DE | 4212583 A1 | 10/1993 |
| DE | 4340291 A1 | 6/1995 |
| DE | 102005011805 A1 | 1/2007 |
| DE | 102007037400 A1 | 2/2009 |
| DE | 102008023701 A1 | 11/2009 |
| EP | 2753465 B1 | 8/2016 |

\* cited by examiner

QUICK-CHANGE MANDREL HAVING ACTIVE PREFORM CLAMPING

BACKGROUND

The invention relates to a transport system for transporting preforms in a device for the blow-molding production of finished containers, wherein the transport system comprises a transport chain, the chain elements of which comprise a support element and a transport element. The invention also relates to a device for the blow-molding production of finished containers from preforms, as well as a use of the transport system, and a method for exchanging at least one support element of the transport system.

In order to package liquid foods and beverages, normally containers such as, e.g., bottles made of glass or plastic are used, which are created on various devices in a production process and subsequently filled on a further device. Examples of this would be the production of containers made of plastic in a blowing device. When forming containers through the effect of blowing pressure, preforms of a thermoplastic material, for example preforms of PET (polyethylene terephthalate), are supplied to different processing stations within a blow molding machine. Typically, such a blow molding machine has a heating mechanism as well as a blowing mechanism, in the region of which the previously temperature-controlled preform is expanded into a container through biaxial orientation. The expansion takes place with the assistance of compressed air, which is introduced into the preform to be expanded, and optionally an additional extension. The process-engineering sequence with such an expansion of the preform is explained, for example, in DE-OS 43 40 291. The introduction of the pressurized gas also comprises the introduction of pressurized gas into the developing container bubble as well as the introduction of pressurized gas into the preform at the start of the blowing process. The basic structure of a blowing station for forming containers is described in DE-OS 42 12 583. Possibilities for the temperature control of the preforms are explained in DE-OS 23 52 926.

During the production and filling processes, it is necessary to transport the containers and transfer them from one station to another between the individual process steps. The preforms as well as the blow-molded containers can be transported within the device for blow molding with the assistance of different handling devices. Particularly the use of transport mandrels, onto which the preforms are placed, has been tried and tested.

An exemplary device with transport mandrels for transporting the preforms and containers is known from EP 2 753 465 A1. The blowing mechanism comprises multiple blowing stations, which are arranged on a rotating blowing wheel, for forming the preforms into the finished containers, as well as retaining devices for retaining and transporting the preforms. The retaining devices shown in EP 2 753 465 A1 have multiple, namely at least two, positionable clamping elements in the region of their head, said head being insertable into an opening section of the preform, said clamping elements being rounded at least in regions and being arranged spaced relatively apart from one another along an outer circumference, thus being circumferentially spaced apart from one another. At least one of the clamping elements is positioned in a recess arranged laterally on the head with respect to a longitudinal axis of the retaining device, wherein the recess has upper and lower sliding surfaces, extending diagonally with respect to the longitudinal axis, for impacting the clamping element and wherein the head has a head lower part provided with the lower sliding surface and a head upper part provided with the upper sliding surface. The preform in this case is substantially formed with a cylindrical inner surface in the region of its opening section. Suitable further clamping elements for transporting preforms are described, e.g., in DE 10 2005 011 805 A1 and DE 10 2008 023 701 A1.

The transport mandrels used for transporting the preforms must be replaced regularly, for example to reset the device for the blow-molding production of finished containers for a different type of preform or for replacing worn or soiled parts. The exchanging of the transport mandrels is relatively complex and must be carried out manually. In order to reduce the work effort required for exchanging the transport mandrels, a stable transport system with automatically exchangeable transport mandrels for preforms would be desirable, which enables a quick change of the transport mandrels despite stable retention of the preforms.

Thus, the object of the present invention is to design a device of the aforementioned type such that reliable transport of the preforms is supported at a high transport rate and additionally quick exchanging of the transport mandrels is ensured.

DESCRIPTION

This object is achieved according to the invention in that the transport mandrels, which are characterized herein as transport elements, are formed in two parts, wherein the preform is detachably retained on a head part of the transport mandrel and the head part of the transport mandrel is detachably retained on a shaft part of the transport mandrel. The head part in this case can be detached from the shaft part in that a mechanism arranged in the shaft part end region facing away from the head part is actuated. The detachable retention of both the preform on the head part of the transport mandrel as well as the head part on the shaft part can take place here by means of clamping elements or in another manner.

The transport elements according to the invention have the advantage that the head parts used are quickly and reliably exchangeable. Because the head part can be detached from the other end of the shaft part, the head part cannot only be detached manually but also automatically in an uncomplicated manner. In this manner, the transport system can be quickly adapted to a different type of preforms, e.g. preforms with a different opening diameter, by means of exchanging the head part. When using clamping elements as the attachment, an especially reliable and solid hold is moreover provided and thereby a high transport rate is supported.

Thus, the invention relates, in a first aspect, to a transport system for transporting preforms in a device for the blow-molding production of finished containers, wherein the transport system comprises a transport chain, the chain elements of which have a support element for transporting the preforms, wherein the support element comprises a shaft part and a head part, and the head part has a head end region which can be inserted into the opening section of the preform, characterized in that the head part is retained on the shaft part and is detachable from the shaft part by means of actuating a first actuation element, wherein the first actuation element is arranged in the shaft part end region facing away from the head part. The preform can be detached from the head part by means of actuation of a second actuation element, wherein the second actuation element is arranged in the shaft part end region facing away from the head part and/or can be actuated by the first actuation element.

The head part in this case can be retained on the shaft part by means of the reset force of a shaft-part spring. This shaft-part spring is arranged in or on the shaft part, preferably in the end region of the shaft part which is opposite the end retaining the head part. The reset force of the spring preferably acts along the longitudinal axis of the shaft part. The preform can be retained on the head part, in a similar manner, by means of the reset force of a head-part spring.

In other words, the object according to the invention is thus achieved in that the head part and the shaft part are tensioned relative to one another by at least one spring, which impacts the shaft part in a region facing away from the head part, and furthermore the head part and a preform or container are tensioned relative to one another by at least one further spring, which impacts the head part.

The reset force of the shaft-part spring may impact, e.g., clamping elements which are suitable for retaining the head part on the shaft part. Thus, the shaft part may have at least two positionable, rounded shaft-clamping elements in a shaft end region which can be inserted into the opening section of the head part, said shaft-clamping elements being arranged spaced relatively apart from one another along the outer circumference of the shaft end region and which can be shifted radially from the longitudinal axis of the support element by means of actuating the first actuation element.

The reset force of the head-part spring may impact, e.g., clamping elements which are suitable for retaining the preform on the head part. Thus, the head part may have at least two positionable, rounded head-clamping elements in a head end region which can be inserted into the opening section of the preform, said bead-clamping elements being arranged spaced relatively apart from one another along the outer circumference of the head end region and which can be shifted radially from the longitudinal axis of the support element by means of actuating a second actuation element.

The clamping elements may each be arranged laterally in recesses, which have sliding surfaces, on which the respective clamping element can be shifted reversibly outward through the introduction of force (e.g. the effect of the reset force of a spring). By means of this shifting of the clamping elements, the outer circumference of the head part or of the shaft part, respectively, is enlarged such that a pressure is exerted on the inner wall of the preform or the head part, respectively, and the preform or the head part, respectively, is securely retained.

Thus, at least one of the shaft-clamping elements may be positioned in a recess, arranged on the shaft part laterally with respect to a longitudinal axis of the support element, wherein the recess has upper and lower sliding surfaces, extending diagonally with respect to the longitudinal axis, for impacting the shaft-clamping element and wherein the shaft part has a shaft-end-region upper part provided with the upper sliding surface and a shaft inner part provided with the lower sliding surface, wherein the shaft-end-region upper part and the shaft inner part are tensioned relative to one another by at least one shaft-part spring, which impacts the shaft inner part.

In a similar manner, at least one of the head-clamping elements may be positioned in a recess, arranged on the head part laterally with respect to a longitudinal axis of the support element, wherein the recess has upper and lower sliding surfaces, extending diagonally with respect to the longitudinal axis, for impacting the head-clamping element and wherein the head part has a head upper part provided with the upper sliding surface and a head inner part provided with the lower sliding surface, wherein the bead upper part and the head inner part are tensioned relative to one another by at least one head-part spring, which impacts the head inner part.

Due to the impact of the upper side of the shaft part, facing away from the head part, with the spring, preferably a compression spring, an impact of the shaft-clamping elements protruding from the recesses of the shaft end region takes place, upon a shifting of the opening section of a bead part onto the shaft end region, such that these shaft-clamping elements are shifted in the direction of the end of the shaft part opposite the head part and/or in the direction of the interior of the shaft part. According to the invention, the "interior" of the shaft part is in the direction of the center axis of the support element and/or of the shaft part, that is, e.g., from the direction of the outer circumference of the shaft part into the direction of the center axis of the shaft part. The shaft-clamping elements in this case transfer the forces acting in the direction of the longitudinal axis of the support element onto the head part and retain it securely by means of the inner pressure exerted. "Inner pressure" in terms of the invention is a clamping pressure exerted from the interior, e.g. a pressure which is exerted from the direction of the longitudinal axis of the support element in the direction of the outer circumference of the support element, shaft part, and/or head part.

Due to the impact of the head part with a further spring, preferably a compression spring, an impact of the head-clamping elements, protruding from the recesses of the head part, takes place, upon a shifting of the opening section of a preform or of a container onto the head part, such that these head-clamping elements are shifted in the direction of the head upper part and/or in the direction of the interior of the head part. The "interior" of the head part is in the direction of the center axis of the support element according to the invention. The head-clamping elements in this case transfer the forces acting in the direction of the longitudinal axis of the support element onto the opening section of the preform or container and retain them securely by means of the inner pressure and/or clamping pressure exerted.

An arrangement of the shaft-part spring such that the shaft part is impacted by the spring in a region facing away from the head part particularly enables the positioning of the spring in a region outside of the opening section of the preform. The spring is hereby arranged in a region, which is sufficiently large enough to accommodate the spring such that the use of the spring does not lead to unnecessarily complicated geometry of the head part. Moreover, the arrangement of the shaft-part spring takes place in a region which is typically not impacted by radiant heat during heating of the preforms.

The arrangement of the head-part spring such that the head inner part is impacted in its interior by the spring furthermore enables a space-saving placement of this spring.

In contrast to a direct impact of the shaft- and head-clamping elements by one or more resilient elements, this design thus has significant advantages with respect to achieving a compact and clearly structured design as well as with respect to provision of a sustainably valuable function.

According to a customary use, the head end region of the head part is completely inserted into the opening section of the preform and/or of the container and/or the shaft end region of the shaft part is completely inserted into the head part. The head upper part protrudes from the opening section of the preform in the region of its expansion facing away from the head end region. The shaft part protrudes from the opening section of the head part in the region of its expansion facing away from the shaft end region.

The head part and the preform or container thus each have an opening section on one side. An opening in terms of the invention is a recess or indentation. Preferably, the opening has a substantially cylindrical shape. In any case, the opening is formed such that its counterpart (i.e. the end region of the shaft part and/or the head end region) fits into the opening. Preferably, the counterpart is contiguously enclosed by the opening or the part comprising the opening after insertion of the counterpart into the opening. On the side opposite the opening section, the head part and the preform and/or container are preferably closed.

The longitudinal axis of the support element is preferably the center axis of the shaft part or alternatively an axis parallel to said center axis.

The shaft inner part may have an end face for impacting the head inner part. The end face may be even or uneven and have, e.g., a shape adapted to the head inner part.

The shaft inner part may extend through the shaft-part spring. The shaft-part spring is preferably supported on a protrusion of the shaft part. The resilient tensioning of the shaft part relative to the head part can hereby be implemented. According to a design variant, it is intended that the protrusion is formed by a recess.

The head-part spring preferably extends in the interior of the head inner part. The head-part spring is preferably supported on an end plate in the interior of the head inner part. The end plate, just as the end face of the shaft inner part, may be even or uneven and have, e.g., a shape adapted to the head-part spring.

An economical design is supported in that the shaft part is formed from a shaft inner part, which is, e.g., bar- or rod-shaped and/or comprises a shaft bar and a shaft inner tube enclosing said shaft bar at least in regions, and is formed from a tube enclosing the shaft inner part at least in regions.

In one embodiment, the shaft inner part comprises a shaft bar and a shaft inner tube enclosing the shaft bar at least in regions. In this manner, the shaft-clamping elements retaining the head part may be separately detached and tensioned by the head-clamping elements. This provides a further advantage of an even more secure retaining of the head part once the preform has been removed from the support element. In other words, a further spring-tensioned retaining element may be supplemented in that, e.g., a shaft part of rod shape is replaced by a shaft part of tube shape (shaft inner tube) having an inner shaft part of rod or tube shape (shaft bar), said retaining element actively tensioning and releasing the preform in order to place the preform and remove it from the support element without force. The second clamping element in this embodiment is actuated by a shaft bar lying in the shaft inner tube, said shaft bar possibly having a rod shape. The shaft inner tube may thus have the lower sliding surface for impacting the shaft-clamping element. According to the invention, the shaft bar may likewise have the end face for impacting the head inner part.

The shaft-clamping elements and head-clamping elements are also characterized herein as clamping elements. An advantageous transfer of clamping forces is achieved in that the clamping element is formed in a spherical shape or cylindrically at least in regions and, in the latter case, has tapers in the region of its end regions pointing in the direction of the support element longitudinal axis. For positioning of these clamping elements, it has proven to be advantageous when the tapers are formed as a truncated cone. In this case, a surface transfer of force is achieved in that the tapers have tilt angles relative to the element longitudinal axis, said tilt angles corresponding to the tilt angles of the sliding surfaces. According to the invention however, it is especially preferable for the clamping elements to be formed in the shape of a sphere. The spherical formation of the clamping elements and the use of multiple separate clamping elements enable a defined radial positioning of the clamping elements without an elastic deformation being required. The clamping elements may be positioned precisely in a radial direction for implementing the clamping process.

Due to the spherical contour, simple sliding is supported on the assigned sliding surfaces. Moreover, the clamping forces may each be placed locally restricted in the region of an inner restriction of the opening sections of the preform or container and/or of the head end region.

In preferred embodiments, the head part and/or the shaft part each have at least two clamping elements, preferably at least four, even more preferably at least six clamping elements. The clamping elements are each arranged along an outer circumference spaced relatively apart from one another. In a preferred embodiment, the distances between the clamping elements arranged about the outer circumference are each the same. The clamping elements may be opposite one another in an advantageous manner. In one embodiment, the head part and/or the shaft part thus have an even number of clamping elements along an outer circumference.

The recesses are preferably formed as recesses in the outer side of the corresponding parts (of the head part and/or of the shaft part). The diameter of the recess on the outer side of the part is advantageously less than the maximum diameter of the clamping elements, particularly the spherical clamping elements. In this manner, the clamping elements are prevented from falling out of the recesses. At the same time, the diameter of the recess in the outer side of the part is large enough to ensure that the clamping element can move from the direction of the center axis of the part, over the outer circumference of the part, in order to securely clamp the respective opening section.

The recess may have upper and lower sliding surfaces, diagonal with respect to the longitudinal axis, for impacting the respective clamping element. One of the sliding surfaces in this case is formed on the respective part (the head part or the shaft part) and the other on the corresponding mobile element (head inner part or shaft inner part). The respective sliding surface in this case may have, e.g., an angle of from 10° to 80°, preferably of from 20° to 70°, even more preferably of from 30 bis 60°, e.g. about 45°, relative to the longitudinal axis.

A transport of the preforms or containers without implementing turning operations is supported in that the preforms are transported, oriented upward, by the support element, with their opening sections in the vertical direction at least along one part of their transport path.

In a further aspect, the invention relates to a device for the blow-molding production of finished containers from preforms, particularly from preforms of a thermoplastic material, having at least one heating mechanism for thermal conditioning of the performs along a transport path and having at least one forming device for forming thermally conditioned preforms into finished containers, characterized in that the device has at least one transport system according to the invention for transporting the preforms, wherein the transport system is arranged particularly in the region of the heating mechanism.

In yet a further aspect, the invention relates to a use of a transport system according to the invention in a device for the blow-molding production of finished containers from preforms, particularly from preforms of a thermoplastic material, having at least one heating mechanism for thermal conditioning of the preforms along a transport path and having at least one forming device for forming thermally conditioned preforms into finished containers, wherein the use particularly takes place in the region of the heating mechanism.

Finally, in a further aspect, the invention also relates to a method for exchanging at least one head part of a transport system according to the invention, in which the head part of the transport system is separated from the shaft part and replaced by a different head part.

SHORT DESCRIPTION OF THE FIGURES

In connection with the following figures, the invention shall be explained in greater detail by means of exemplary embodiments of the invention. The following is shown.

EXEMPLARY EMBODIMENTS

Further advantages, characteristics, and features of the present invention are clarified with the subsequent detailed description of exemplary embodiments by mean of the enclosed drawings. However, the invention is not limited to these exemplary embodiments.

Figure 1:
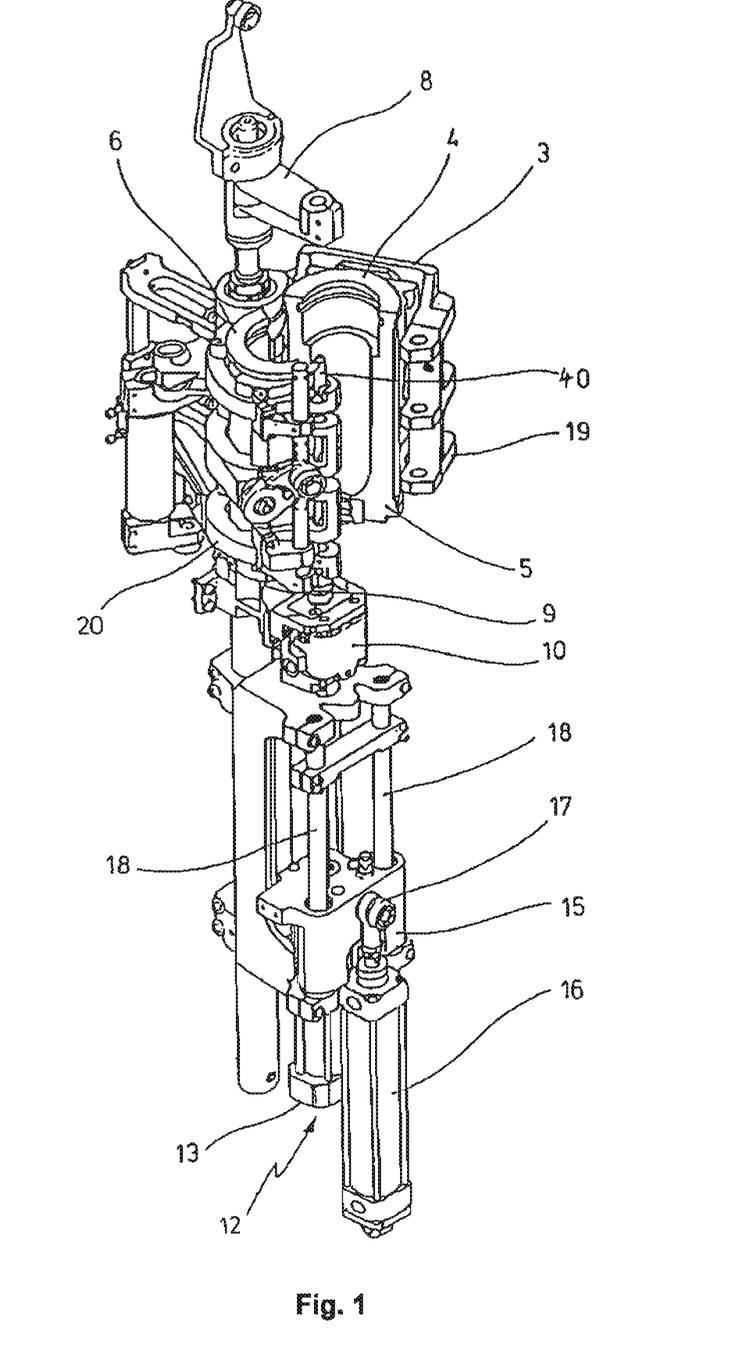
FIG. 1 a perspective representation of a blowing station for producing containers of performs.
Figure 2:
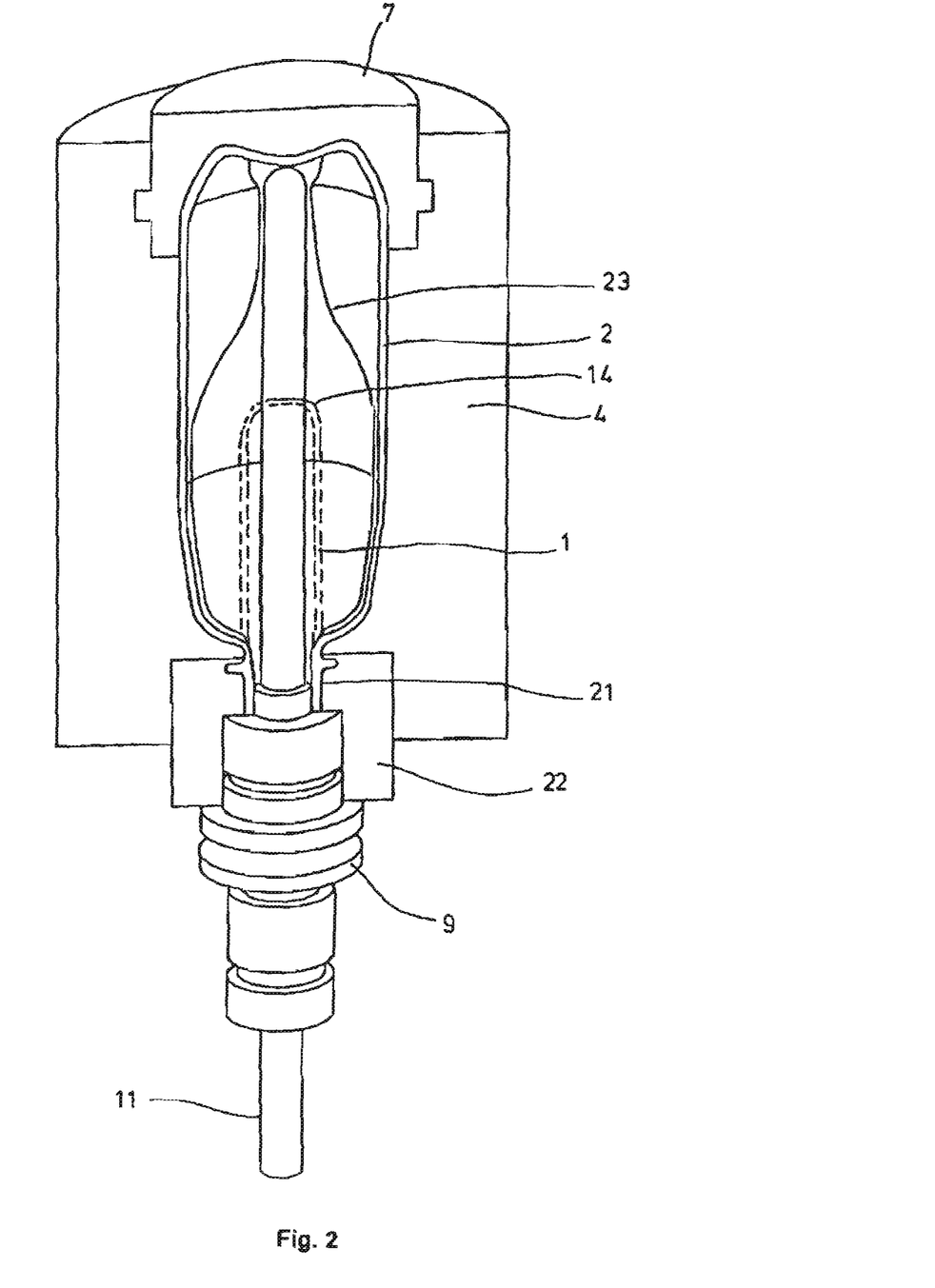
FIG. 2 a longitudinal section through a blow mold, in which a preform is extended and expanded, FIG. 3 a sketch to illustrate a basic construction of a device for blow molding containers.

The principal construction of a device for forming preforms (1) into containers (2) is shown in FIG. 1 and in FIG. 2. The arrangement in this case may be as shown or may be rotated by 180° in a vertical plane.

The device for forming the container (2) substantially consists of a blowing station (3), which is equipped with a blow mold (4), into which a preform (1) can be inserted. The preform (1) may be an injection-molded part of polyethylene terephthalate. To enable insertion of the preform (1) into the blow mold (4) and to enable removal of the finished container (2), the blow mold (4) consists of mold halves (5, 6) and a base part (7), which can be positioned by a lifting device (8). The preform (1) may be fixed in position in the region of the blow station (3) by a retaining element (9). For example, it is possible to insert the preform (1) directly into the blow mold (4) using tongs or other handling means.

To enable a supply of compressed air, a connecting piston (10), which supplies compressed air to the preform (1) and simultaneously provides a seal, is arranged underneath the blow mold (4). In a modified design however, it is basically conceivable to use fixed compressed air supply lines.

Stretching of the preform (1) in this exemplary embodiment takes place with the assistance of a stretching rod (11), which is positioned by a cylinder (12). According to another embodiment, mechanical positioning of the stretching rod (11) is implemented by means of curved segments, which are impacted by pickup rollers. The use of curved segments is then particularly appropriate when a plurality of blowing stations (3) are arranged on a rotating blowing wheel (25).

With the embodiment shown in FIG. 1, the stretching system is formed such that a tandem arrangement of two cylinders (12) is provided. The stretching rod (11) is initially moved, before the start of the actual stretching process, into the region of a base (14) of the preform (1) by a primary cylinder (13). During the actual stretching process, the primary cylinder (13) with the stretching rod extended, together with a carriage (15) supporting the primary cylinder (13), is positioned by a secondary cylinder (16) or by means of a cam controller. In particular, it is intended to use the secondary cylinder (16), in a cam-controlled manner, such that a current stretching position is specified by a guide roller (17), which slides along a curved track during implementation of the stretching process. The guide roller (17) is pressed against the guide track by the secondary cylinder (16). The carriage (15) slides along two guide elements (18).

After closing of the mold halves (5, 6) arranged in the region of carriers (19, 20), the carriers (19, 20) are locked relative to one another with the assistance of a locking device (40).

In order to adapt to different shapes of an opening section (21) of the preform (1), the use of separate threaded inserts (22) in the region of the blow mold (4) is provided according to FIG. 2.

In addition to the blow-molded container (2), FIG. 2 also shows the preform (1) in dashes and a developing container bubble (23) schematically.

Figure 3:
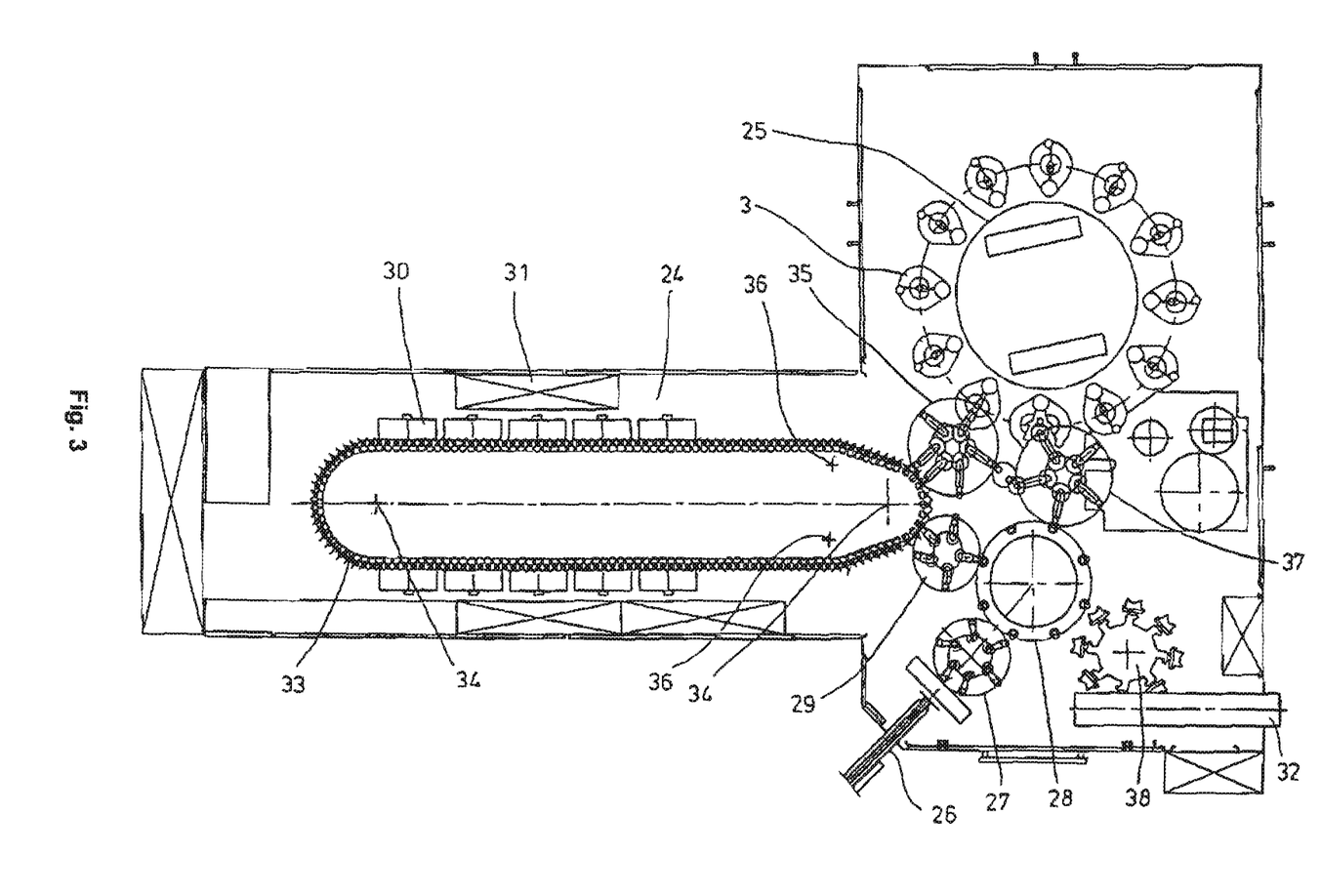

FIG. 3 shows the basic construction of a blow molding machine, which is equipped with a heating zone (24) as well as a rotating blowing wheel (25). Starting from a preform insertion (26), the preforms (1) are transported into the region of the beating zone (24) by transfer wheels (27, 28, 29). Radiant heaters (30) and blowers (31) are arranged along the heating zone (24) in order to regulate the temperature of the preforms (1). After sufficient temperature control of the preforms (1), they are transferred to the blowing wheel (25) by a transfer wheel (35), with the blowing stations (3) being arranged in the region of the blowing wheel. The completely blow-molded containers (2) are supplied to a discharge zone (32) by further transfer wheels (37, 28, 38). Transfer wheel (37) in this case is formed as a removal wheel; transfer wheel (38) is formed as a discharge wheel.

In order to enable forming of a preform (1) into a container (2) such that the container (2) has material properties which ensure a long-term usefulness of foods filled within the container (2), particularly of beverages, special process steps must be maintained when heating and positioning the preforms (1). Moreover, advantageous effects can be achieved by maintaining special dimensioning specifications.

Different plastics can be used as the thermoplastic material. For example, PET, PEN, or PP can be used.

The expansion of the preform (1) during the positioning process takes place using a supply of compressed air. The compressed air is supplied in a pre-blowing phase, in which gas, for example compressed air, is supplied at a low pressure level and subdivided into a subsequent primary blowing phase, in which gas is supplied at a higher pressure level. Typically compressed air having a pressure in a range from 10 bar to 25 bar is used during the pre-blowing phase, and compressed air having a pressure in a range from 25 bar to 40 bar is supplied during the primary blowing phase.

It is likewise discernible from FIG. 3 that, with the embodiment shown, the heating zone (24) is formed from a plurality of circumferential transport elements (33), which are arranged next to one another, guided like a chain, and along diverter wheels (34, 36). In particular, it is intended to clamp a substantially rectangular, basic contour by means of the chain-like arrangement. With the embodiment shown, an individual relatively large-dimensioned diverter wheel (34) is used in the region of the heating zone (24) expansion facing the transfer wheel (27) and two comparatively smaller-dimensioned diverter wheels (36) are used in the region of adjacent deflections. Any other thicknesses, however, are essentially also conceivable.

To enable the most dense arrangement possible of the transfer wheel (27) and of the blowing wheel (25) relative to one another, the arrangement shown has proven to be especially suitable, because three diverter wheels (34, 36) are positioned in the region of the corresponding expansion of the heating zone (24), that is the smaller diverter wheels (36) in the region of the transition to the linear contours of the heating zone (24) and the larger diverter wheel (34) in the direct transfer region to the transfer wheel (27) and to the blowing wheel (25). As an alternative to using chain-like transport elements (33), it is also possible, for example, to use a rotating heating wheel.

After complete blow molding of the containers (2), they are moved from the region of the blowing stations (3) by the transfer wheel (38) and transported to the discharge zone (32).

Figure 4:
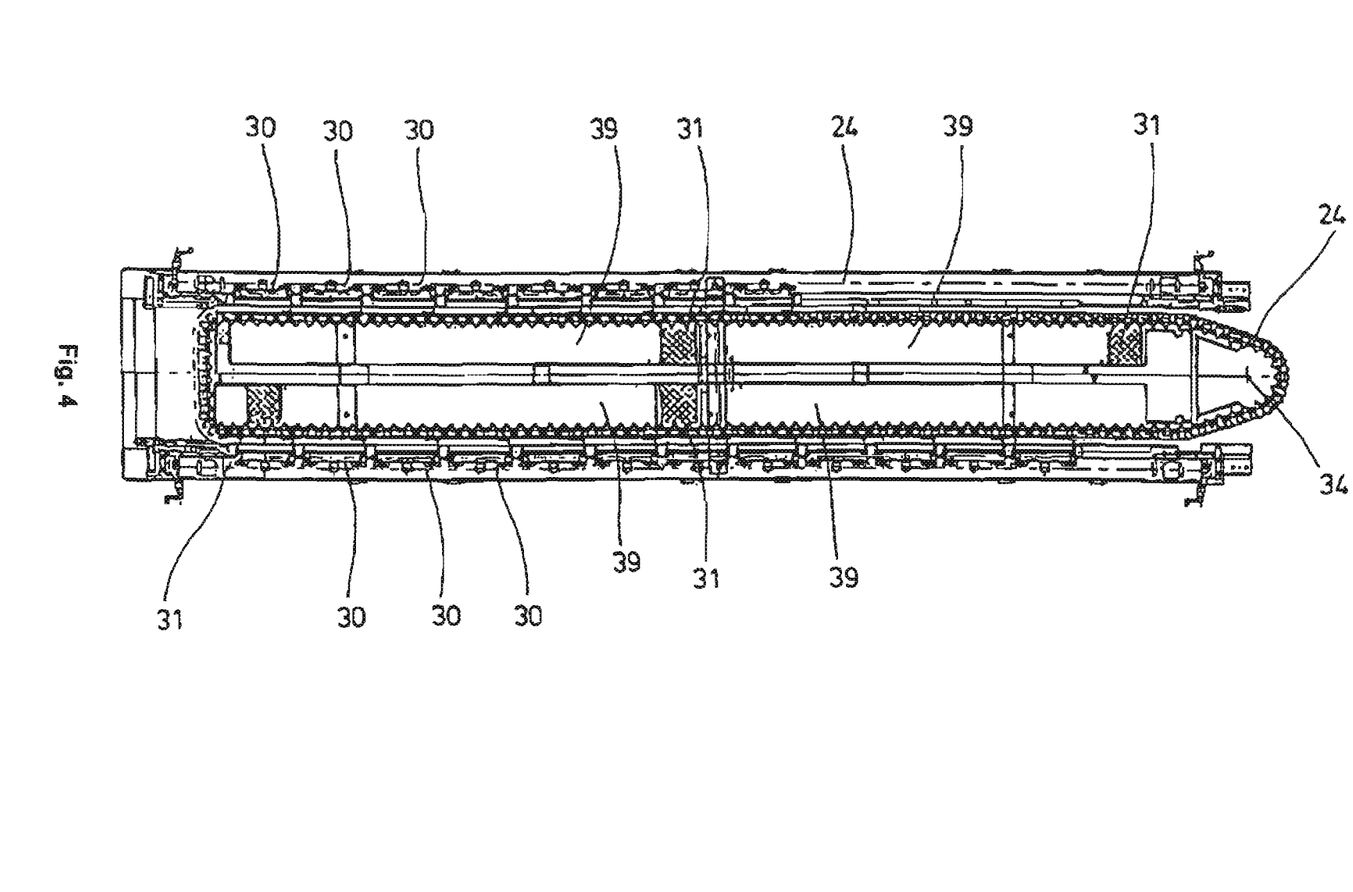
FIG. 4 a modified heating zone with increased heating capacity.

In the modified heating zone (24) shown in FIG. 4, a larger quantity of preforms (1) are temperature-controlled per unit of time by means of the larger number of radiant heaters (30). The blowers (31) introduce cooling air into the region of cooling air channels (39) here, which are each opposite the assigned radiant heaters (30) and discharge the cooling air via outflow openings. Due to the arrangement of the outflow directions, a flow direction is implemented for the cooling air substantially transverse to a transport direction of the preforms (1). The cooling air channels (39) can provide reflectors for radiant heating in the region of the surfaces opposite the radiant beaters (30); it is likewise possible to also implement cooling of the radiant heaters (30) via the discharged cooling air.

A transport of the preforms (1) and the containers (2) through the blow molding machine can take place in a different type and manner. According to an embodiment variant, the preforms are moved along the substantial part of their transport path by transport mandrels. However, it is also possible to implement a transport of the preforms using tongs, which grasp the preform on the outer side, or to use inner mandrels, which are introduced into an opening section of the preform. Different variants are likewise conceivable with respect to the spatial orientation of the preforms.

According to one variant, the preform is supplied with its opening oriented upward in the vertical direction in the region of the preform insertion (26); it is then rotated, moved along the heating zone (24) and the blowing wheel (25) with its opening oriented downward in the vertical direction, and further rotated before reaching the discharge zone (32). According to another variant, the preform (2) is heated in the region of the heating zone (24) with its opening oriented downward in the vertical direction, and then again rotated 180° before reaching the blowing wheel (25).

According to a third embodiment variant, the preform passes through the entire region of the blow molding machine, without the implementation of turning operations, with its opening oriented upward in the vertical direction.

Figure 5:
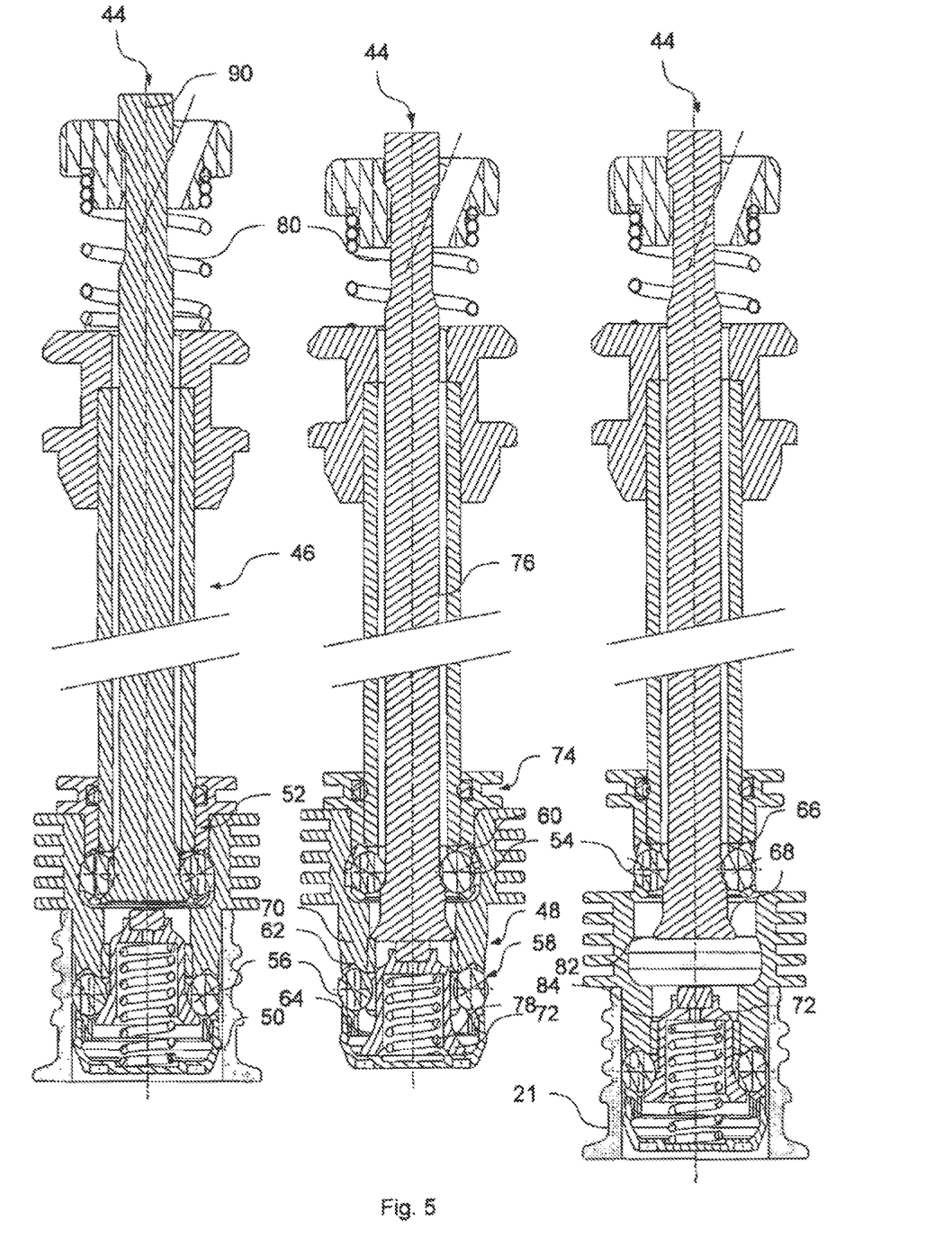
FIG. 5 three vertical sections of a support element according to the invention in which (left) a preform and head part are retained on the shaft part, (center) the preform is detached and the head part is retained on the shaft part, and (right) the head part together with the preform is detached from the shaft part.

FIG. 5 shows, in three lengthwise vertical sections, the positioning of the head part (48) within an opening section (21) of a preform (1) or of a container (2) as well as the positioning of the shaft part (46) and/or of the shaft end region (52) within the head part (48).

The three figures (left, middle, right) show the support element (44) in three different stages, wherein (left) the preform (1)/container (2) and head part (48) are retained on the shaft part (46), (center) the preform (1)/container (2) is detached, and the head part (48) is retained on the shaft part (46), and (right) the head part (48), together with the preform (1)/container (2), is detached from the shaft part (52).

The support element (44) has a shaft part (46) and a head part (48), wherein the head part (48) and shaft part (46) are connected to one another (separable) in the figure to the left and in the middle. The shaft part (46) with the head part (48) is movable, relative to an element base which is not shown, in the direction of an element longitudinal axis, which is not shown. According to a typical exemplary embodiment, a plurality of support elements (44) can be connected to one another in a chain-like manner, e.g. via the element bases, or are connected to a circumferential transport chain. The support element (44), however, may also be attached to circumferential transfer wheels or other devices.

It can also be noted that the head part (48) has recesses (58), in which head-clamping elements (56) are arranged. The recesses (58) are arranged in the head end region (50) insertable into the opening section (21) of the preform (1) and arranged laterally on the head part (48) with respect to a longitudinal axis (90) of the support element (44). The recesses (58) each comprise a head-clamping element (56), which is rounded in the exemplary embodiment shown and preferably has a spherical shape.

The head part (48) shown has six head-clamping elements (56), of which two are visible in the vertical sections shown. The head-clamping elements (56) are arranged spaced relatively apart from one another along the outer circumference of the head end region (50). Preferably, the distance is uniform between the head-clamping elements (56), i.e. all head-clamping elements (56) have the same distance to their adjacent head-clamping elements (56).

The recess (58) has upper and lower sliding surfaces (62, 64), extending diagonally with respect to the longitudinal axis (90), for impacting the respective head-clamping element (56). In particular, the head part (48) has a head upper part (70) provided with the upper sliding surface (62) and a head inner part (72) provided with the lower sliding surface (64). As is shown, the upper sliding surface (62) may have part of a V-shaped protrusion within the recess (58). Such a protrusion effectively retains the head-clamping element (56) within the recess (58) and still permits the shifting of the head-clamping element (56), e.g. orthogonally with respect to the longitudinal axis (90), during detachment or fixing of the head-clamping element (56). The lower sliding surface (64) is preferably arranged on the head inner part (72). The head inner part (72) more preferably can be shifted within the head part (48) along the longitudinal axis (90). Due to this shifting movement in the direction of the support element end opposite the head part, the lower sliding surface (64) is placed in contact with the head-clamping element (56) and/or the head-clamping element (56) slides within the recess (58) further outward from the middle of the head part (48) along the lower sliding surface. Due to this movement, an inner pressure is exerted onto an opening section (21) positioned on the head part (48) such that the opening section (21) is securely clamped on the head part (48).

In the exemplary embodiment shown, the head inner part (72) is actuated by means of a rod-shaped shaft inner part (76). If the shaft inner part (76) is moved along the longitudinal axis (90) in the direction of the head inner part (72), the end face (82) of the shaft inner part (76) then presses onto the head inner part (72), against the spring force of the bead-part spring (78), which is formed as a compression spring. This head-part spring (78) tensions the head upper part (70) and the head inner part (72) relatively with respect to one another. The head inner part (72) is formed in the shape of a bell in the example shown. The head-part spring (78) is arranged in the interior of the bell shape. By means of sufficient pressure onto the head inner part (72) with the shaft inner part (76), the pressure exerted onto the head-clamping element (56) by means of the lower sliding surface (64) is reduced or suspended, and the head-clamping element (56) moves more strongly in the direction of the interior of the head part (48) and/or the clamping pressure exerted onto the opening section (21) by means of the head-clamping element (56) is reduced (FIG. 5, middle). The inner pressure/clamping pressure exerted onto the opening section (21) is reduced such that the preform (1) and/or the container (2) can be removed from or come off of the support element (44).

The shaft inner part (76) can be actuated in the direction of the longitudinal axis (90) by means of pressure exerted onto its end opposite the head part (48). Other actuation mechanisms are also conceivable. Through actuation of the shaft inner part (76), the spherical head-clamping elements (56) are released, i.e. detached and shifted in the direction of the head part interior. Based on this active actuation mechanism, the support element (44) is also characterized as an active mandrel.

It should be noted that the shaft part (46) has recesses (60) in a shaft end region (52), which can be inserted into the opening section of the head part (48), with shaft-clamping elements (54) being arranged in said recesses. The recesses (60) are arranged in the head end region (52) insertable into the opening section of the head part (48) and arranged laterally on the shaft part (46) with respect to a longitudinal axis (90) of the support element (44). The recesses (60) each comprise a shaft-clamping element (54), which is rounded in the exemplary embodiment shown and preferably has a spherical shape.

The shaft part (46) shown has six shaft-clamping elements (54), of which two are visible in the vertical sections shown. The shaft-clamping elements (54) are arranged spaced relatively apart from one another along the outer circumference of the shaft end region (52). Preferably, the distance is uniform between the shaft-clamping elements (54), i.e. all shaft-clamping elements (54) have the same distance to their adjacent shaft-clamping elements (54).

The recess (60) has upper and lower sliding surfaces (66, 68), diagonal with respect to the longitudinal axis (90), for impacting the respective shaft-clamping element (54). In particular, the shaft part (46) has a shaft-end-region upper part (74) provided with the upper sliding surface (66) and a shaft inner part (76) provided with the lower sliding surface (68). As is shown, the upper sliding surface (66) may have part of a V-shaped protrusion within the recess (60). Such a protrusion effectively retains the shaft-clamping element (54) within the recess (60) and still permits the shifting of the shaft-clamping element (54) orthogonally with respect to the longitudinal axis (90), during detachment or fixing of the shaft-clamping element (54). The lower sliding surface (68) is preferably arranged on the shaft inner part (76). The shaft inner part (76) preferably can be shifted within the shaft part (46) along the longitudinal axis (90). Due to this shifting movement in the direction of the support element (44) end opposite the head part, the lower sliding surface (68) is placed in contact with the shaft-clamping element (54) and/or the shaft-clamping element (54) slides within the recess (60) further outward from the middle of the head part (46) along the lower sliding surface (68). Due to this movement, an inner pressure is exerted onto a head part (48) positioned on the shaft part (46), particularly exerted onto the head upper part (70), such that the head part (48) is securely clamped on the shaft part (46).

In the exemplary embodiment shown, the shaft inner part (76), just as the head inner part (72), is actuated by means of a rod-shaped shaft inner part (76), i.e. both groups of clamping elements are actuated by the same actuation mechanism, i.e. by the same shaft inner part (76). If the shaft inner part (76) is moved in the direction of the head inner part (72) along the longitudinal axis (90), the pressure exerted onto the shaft-clamping element (54) by means of the lower sliding surface (68) is reduced or suspended, and the shaft-clamping element (54) moves more strongly in the direction of the interior of the shaft part (46) and/or the clamping pressure exerted onto the opening section of the head part (48) by means of the shaft-clamping element (54) is reduced (FIG. 5, right). The inner pressure/clamping pressure exerted onto the interior of the head part (48) is reduced such that the head part (48) can be removed from or come off of the support element (44). Through actuation of the shaft inner part (76), the spherical shaft-clamping elements (54) are released, i.e. detached and shifted in the direction of the shaft part interior.

Figure 6:
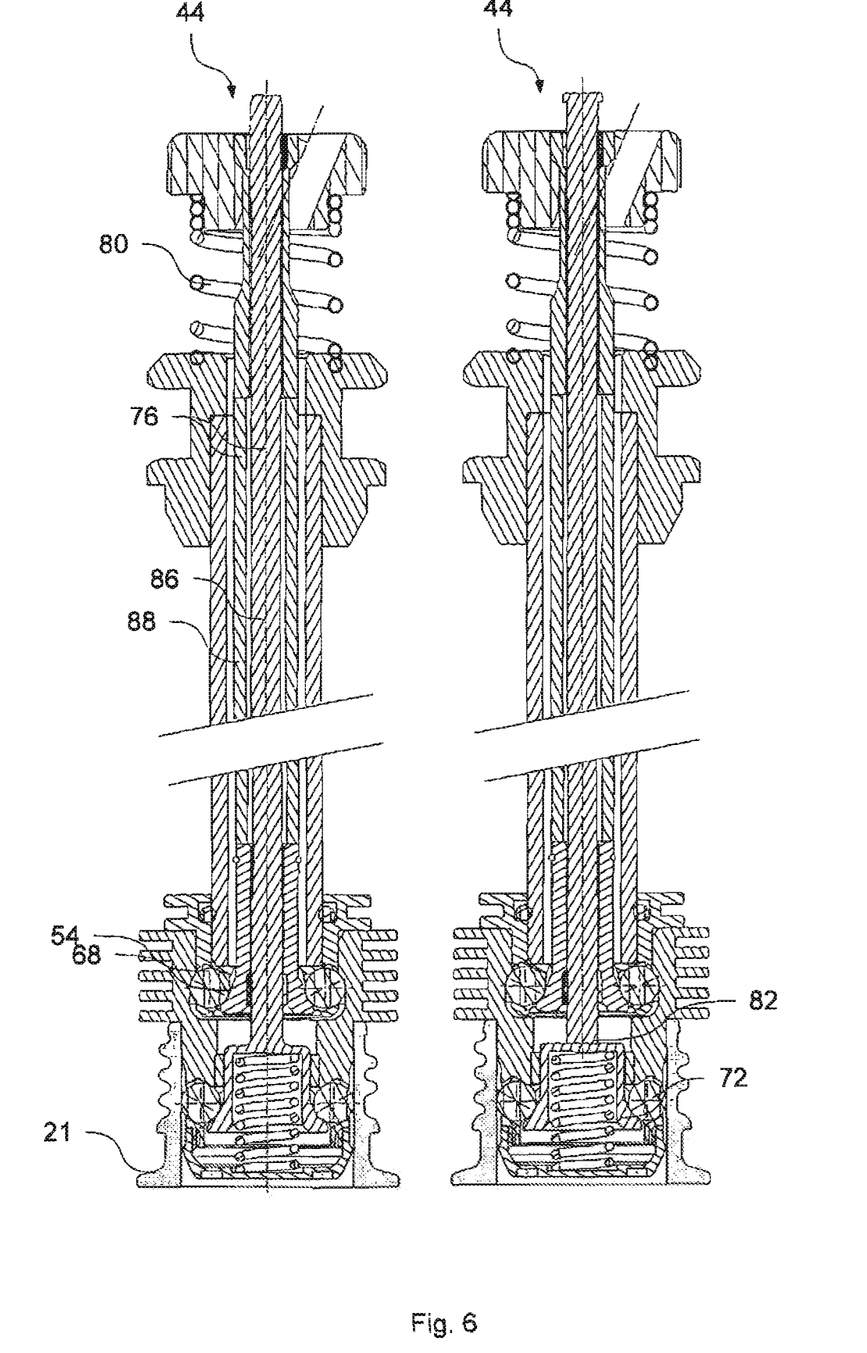
FIG. 6 two vertical sections of further embodiments of a support element according to the invention, in which the preform and head part are retained on the shaft part and (left) the shaft inner tube/the shaft-clamping elements and shaft bar/the head-clamping elements are actuated independently of one another and/or (right) in which the shaft bar engages the shaft inner tube when a threshold value stroke exerted by the shaft bar is exceeded, and thus first the head-clamping elements are actuated and, when the threshold value stroke is exceeded, then the shaft-clamping elements are actuated, and FIG. 7 two side views of a support element according to the invention in which (left) a preform and head part are retained on the shaft part and (right) the head part together with the preform is detached from the shaft part.

FIG. 6 shows, in two vertical sections, further embodiments of a support element (44) according to the invention. In contrast to the embodiments shown in FIG. 5, in the embodiments shown here, the shaft inner tube (88) (and thus the shaft-clamping elements (54)) and shaft bar (86) (and thus the head-clamping elements (56)) are actuated independently of one another. The independent actuation ensures a continued strong retention of the head part (48) after the head-clamping elements (56) have been released and the preform (1) and/or the container (2) have been removed from the head part (48).

In these embodiments, the shaft inner part (76) comprises a shaft bar (86) and a shaft inner tube (88) enclosing the shaft bar (86) at least in regions. In the embodiments shown, the shaft bar (86) is formed in the shape of a bar or rod. Alternatively, the shaft bar (86) may also have, e.g., a hollow cylindrical shape however. The shaft bar (86) and the shaft inner tube (88) both extend through the shaft-part spring (80). The shaft bar (86) is connected to the head inner part (72). In doing so, the shaft bar (86) and the head inner part (72) may be formed as one part (left) or multiple parts (right). In other words, the end face (82) of the shaft bar (86) is attached to the head inner part (72). In this manner, the shaft bar (86) and the head inner part (72) can exert compressive forces onto one another. An actuation of the shaft bar (86) also shifts the head inner part (72) in the direction of the support element (44) end retaining the opening section (21). The head inner part (72) and/or its lower sliding surface (64) are detached or released by means of the actuation. In doing so, the head inner part (72) is shifted against the spring force of the head-part spring (78). The release of the head inner part (72) or its lower sliding surface (64) also releases the head-clamping elements (56). The head-clamping elements (56) slide further into the interior of the shaft part (46) along the lower sliding surface (64). In doing so, the inner pressure exerted onto the opening section (21) is released such that the preform (1) or the container (2) can be removed.

The shaft bar (86) is actuated by means of the pressure exerted onto the shaft bar (86) by the support element (44) end opposite the head part (48). Due to pressure exerted onto the shaft inner tube (88) by the support element (44) end opposite the head part (48), the shaft inner tube (88) can likewise be actuated separately (FIG. 6, left side). In an even further developed embodiment, the shaft inner tube (88) can be actuated due to exceeding of a threshold value stroke exerted by the shaft bar (86), starting from which the shaft bar (86) engages the shaft inner tube (88) (FIG. 6, right side). Due to the engagement of the shaft bar (86) in the shaft inner tube (88), the shaft inner tube (88) is actuated by means of the shaft bar (86). In this manner (FIG. 6, right side), first the head-clamping elements (56) are actuated or released and, when the threshold value stroke is exceeded, then the shaft-clamping elements (58) are also actuated or released.

In the embodiments shown, the shaft inner tube (88) is formed in the shape of a hollow cylinder. The shaft inner tube (88) extends about the shaft bar (86), i.e. the shaft bar (86) extends through the shaft inner tube (88). The shaft inner tube (88) has a rod-like shape on its end facing the head part (48). On the end facing the head part (48), the shaft inner tube (88) has lower sliding surfaces (68). An actuation of the shaft inner tube (88) shifts the lower sliding surfaces (68) in the direction of the support element (44) end retaining the opening section (21). The lower sliding surfaces (68) are detached or released by means of the actuation. The release of the lower sliding surfaces (68) also releases the shaft-clamping elements (54). The shaft-clamping elements (54) slide further into the interior of the shaft part (46) along the lower sliding surfaces (68). In doing so, the inner pressure exerted onto the opening section of the head part (48) is released such that the head part (48) can be removed.

Figure 7:
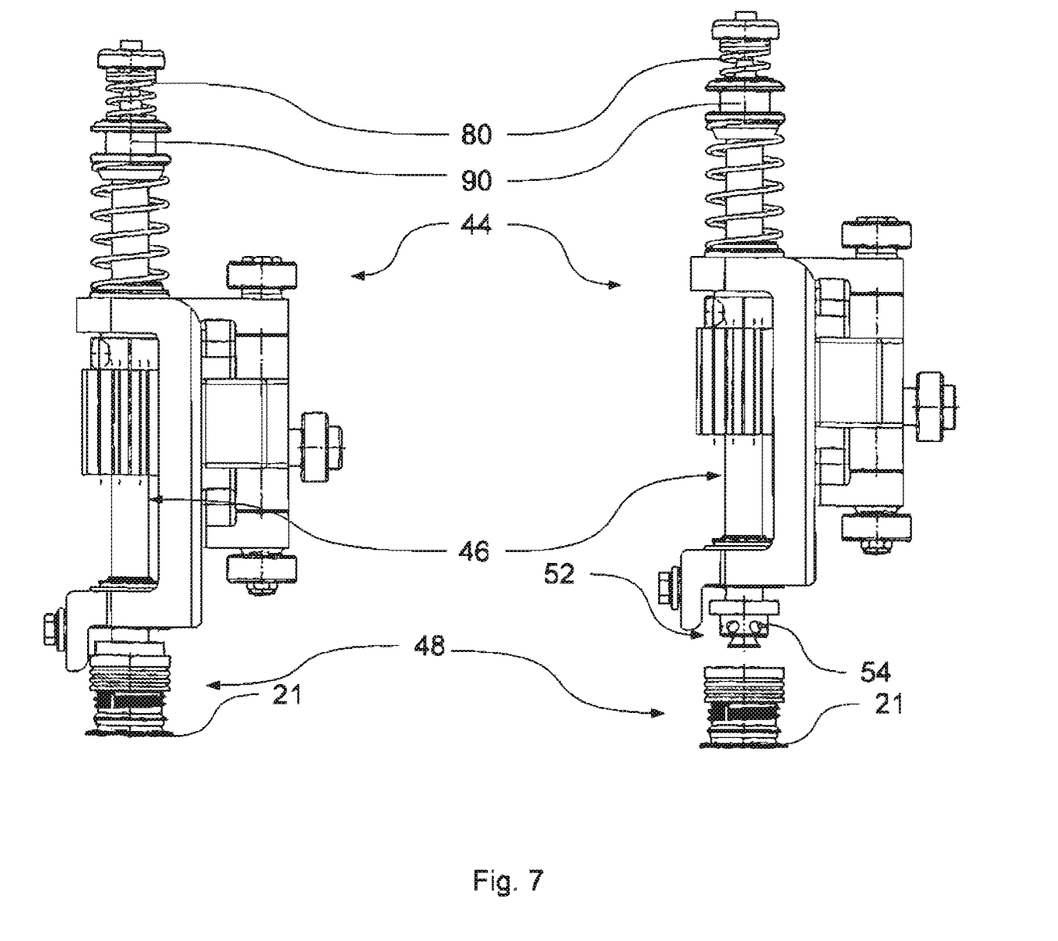

FIG. 7 shows two partial representations of a side view of a preform (1), in the opening section (21) of which a support element (44) is inserted in regions. A support element (44) is shown on the left side, in which neither the head-clamping elements (56) nor the shaft-clamping elements (54) are released. Thus, both the head part (48) as well as the opening section (21) of the preform (1) are securely retained on the support element (44). A support element (44) is shown on the right side, in which the shaft-clamping elements (54) are released such that the head part (48) together with the preform (1) can be detached from the remainder of the support element (44), i.e. particularly of the shaft part (46). The release of the shaft elements (54) takes place by means of actuation of the shaft inner part (76) against the spring force of the shaft-part spring (80), which is formed as a compression spring. The shaft inner part (76) extends through the shaft-part spring (80) along the longitudinal axis (90) of the support element (44).

Although the present invention has been described in detail by means of the exemplary embodiments, it is obvious to one skilled in the art that the invention is not limited to these exemplary embodiments, but rather variations are possible in a manner such that individual features can be omitted or implemented in other types of combinations of the individual features presented, provided this does not go beyond the scope of protection of the enclosed claims. The present disclosure includes all combinations of the individual features presented.

Quick-change mandrel having active preform clamping

LIST OF REFERENCE NUMERALS

| | |
|---|---|
| 1 | Preform |
| 2 | Container |
| 3 | Blowing station |
| 4 | Blow mold |
| 5 | First mold half |
| 6 | Second mold half |
| 7 | Base part |
| 8 | Lifting device |
| 9 | Transport mandrel |
| 10 | Connecting piston |
| 11 | Stretching rod |
| 12 | Cylinder |
| 13 | Primary cylinder |
| 14 | Base |
| 15 | Carriage |
| 16 | Secondary cylinder |
| 17 | Guide roller |
| 18 | Guide element |
| 19 | First carrier |
| 20 | Second carrier |
| 21 | Opening section |
| 22 | Threaded insert |
| 23 | Container bubble |
| 24 | Heating zone |
| 25 | Blowing wheel |
| 26 | Preform insertion |
| 27 | Transfer wheel |
| 28 | Transfer wheel |
| 29 | Transfer wheel |
| 23 | Container bubble |
| 24 | Heating zone |
| 25 | Blowing wheel |
| 26 | Preform insertion |
| 27 | Transfer wheel |
| 28 | Transfer wheel |
| 29 | Transfer wheel |
| 30 | Heating mechanism |
| 30' | Heating mechanism |
| 31 | Blower |
| 32 | Discharge zone |
| 33 | Transport means |
| 34 | Diverter wheel, head wheel |
| 35 | Transfer wheel |
| 36 | Diverter wheel |
| 37 | Transfer wheel |
| 38 | Transfer wheel |
| 39 | Cooling air channels |
| 40 | Locking device |
| 42 | Transport system |
| 44 | Support element |
| 46 | Shaft part |
| 48 | Head part |
| 50 | Head end region |
| 52 | Shaft end region |
| 54 | Shaft-clamping element |
| 56 | Head-clamping element |
| 58 | Recess (head part) |
| 60 | Recess (shaft pari) |
| 62 | Upper sliding surface (head part) |
| 64 | Lower sliding surface (head part) |

| 66 | Upper sliding surface (shaft part) |
| 68 | Lower sliding surface (shaft part) |
| 70 | Head upper part |
| 72 | Head inner part |
| 74 | on upper part |
| 76 | Shaft inner part |
| 78 | Head-part spring |
| 80 | Shaft-part spring |
| 82 | End face |
| 84 | End plate |
| 86 | Shaft bar |
| 88 | Shaft inner tube |
| 90 | Longitudinal axis |

The invention claimed is:

1. A transport system for transporting a preform in a device for blow-molding the preform into a finished container, wherein:
the transport system comprises a transport chain including a chain element;
the chain element has a support element for transporting the preform;
the support element comprises a shaft part and a head part;
the head part has a head end region that is introducible into an opening section of the preform;
the head part is retained on the shaft part and is detachable from the shaft part via actuation of a first actuation element; and
the first actuation element is arranged in an end region of the shaft part facing away from the head part.

2. The transport system according to claim 1, wherein the head part is retained on the shaft part by a reset force of a shaft-part spring.

3. The transport system according to claim 1, wherein the shaft part has at least two positionable, rounded shaft-clamping elements in a shaft end region which is insertable into an opening section of the head part, wherein said shaft-clamping elements are arranged spaced apart relative to one another along an outer circumference of the shaft end region and are shiftable radially from a longitudinal axis of the support element by actuating the first actuation element.

4. The transport system according to claim 3, wherein at least one of the shaft-clamping elements is positioned in a recess arranged on the shaft part laterally with respect to the longitudinal axis of the support element, wherein the recess has upper and lower sliding surfaces extending diagonally with respect to the longitudinal axis for impacting the shaft-clamping element, wherein the shaft part has a shaft-end-region upper part provided with the upper sliding surface and a shaft inner part provided with the lower sliding surface, and wherein the shaft-end-region upper part and the shaft inner part are tensioned relative to one another by at least one shaft-part spring that impacts the shaft inner part.

5. The transport system according to claim 1, wherein the preform is detachable from the head part by actuation of a second actuation element arranged in the shaft part end region facing away from the head part and/or by actuation of the first actuation element.

6. The transport system according to claim 1, wherein the preform is retained on the head part by reset force of a shaft-part spring.

7. The transport system according to claim 1, wherein the head part has at least two positionable, rounded head-clamping elements in a head end region that are insertable into the opening section of the preform, said head-clamping elements being arranged spaced apart relative to one another along an outer circumference of the shaft end region and being shiftable radially from a longitudinal axis of the support element by actuation of the first actuation element.

8. The transport system according to claim 7, wherein at least one of the head-clamping elements is positioned in a recess arranged on the head part laterally with respect to the longitudinal axis of the support element, wherein the recess has upper and lower sliding surfaces extending diagonally with respect to the longitudinal axis for impacting the head-clamping element, wherein the head part has a head upper part provided with the upper sliding surface and a head inner part provided with the lower sliding surface, and wherein the head upper part and the head inner part are tensioned relative to one another by at least one head-part spring that impacts the head inner part.

9. The transport system according to claim 4, characterized in that the shaft inner part comprises a shaft bar and a shaft inner tube at least partially enclosing the shaft bar.

10. A device for blow-molding a preform of a thermoplastic material into a finished container, the device comprising:
at least one heating mechanism for thermal conditioning the preform along a transport path; and
at least one forming device for forming the thermally conditioned preform into the finished container;
wherein the device has at least one transport system according to claim 1 for transporting the preform, and
wherein the transport system is arranged in a region of the heating mechanism.

11. A method of blow-molding a preform of a thermoplastic material into a finished container, the method comprising:
transporting the preform along a transport path through at least one heating mechanism to thermally condition the preform; and
forming the thermally conditioned preform into the finished container using at least one forming device;
wherein the preform is transported by a transport system according to claim 1 in a region of the heating mechanism.

* * * * *